United States Patent [19]
Kincaid et al.

[11] Patent Number: 6,007,080
[45] Date of Patent: Dec. 28, 1999

[54] PLUG IN DIRECT ACTING STABILIZER BAR LINK

[75] Inventors: Jeffrey L. Kincaid, Clarkston; Neil A. Wasylewski, Farmington Hills; Talon T. Harvey, Shelby Township; David L. Young, Bay City, all of Mich.

[73] Assignee: American Axle & Manufacturing Inc., Detroit, Mich.

[21] Appl. No.: 09/346,098

[22] Filed: Jul. 1, 1999

Related U.S. Application Data

[63] Continuation of application No. 09/019,836, Feb. 6, 1998.
[51] Int. Cl.$^6$ .................................................. B60G 21/00
[52] U.S. Cl. .................................................. 280/124.152
[58] Field of Search ..................... 280/124.152, 124.137, 280/124.166

[56] References Cited

U.S. PATENT DOCUMENTS

| | | | |
|---|---|---|---|
| 4,944,523 | 7/1990 | Hardy, Jr. et al. | 280/124.152 |
| 5,352,059 | 10/1994 | Ueno et al. | 280/124.152 |
| 5,387,004 | 2/1995 | Engel | 280/124.152 |
| 5,449,193 | 9/1995 | Rivard et al. | 280/124.152 |
| 5,702,121 | 12/1997 | Song | 280/124.152 |

*Primary Examiner*—Kenneth R. Rice
*Attorney, Agent, or Firm*—Harness, Dickey & Pierce, P.L.C.

[57] ABSTRACT

The present invention provides a suspension assembly including a pair of end links which interconnect the opposite ends of a stabilizer bar to a pair of suspension members. The stabilizer bar has a central segment and arm segments extending from each end of the central segment. The end links interconnect the distal ends of the arm segments to the suspension members. Each distal end of the arm segments includes an axial bore formed therein which is adapted to receive a stud extending from each end link. The stud cooperates with the axial bore to provide a secure attachment between the stabilizer bar and the end link. The axial bore may be internally threaded to receive external threads formed on the stud of the end link. As such, this threaded arrangement permits the stabilizer bar to be attached to the end link quickly and easily and with a minimum of components.

20 Claims, 3 Drawing Sheets

PLUG IN DIRECT ACTING STABILIZER BAR LINK

This is a continuation of U.S. patent application No. 09/019,836, filed Feb. 6, 1998.

FIELD OF THE INVENTION

The present invention relates to a suspension system for motor vehicles and, more particularly, to an end link for connecting a stabilizer bar to a control arm of the suspension system.

BACKGROUND OF THE INVENTION

It is a common practice for motor vehicles to be equipped with independent suspension systems for absorbing road shock and other vibrations while providing a smooth and comfortable ride for the vehicle occupants. In suspension systems of this type, a stabilizer bar is often used to increase the roll rigidity and improve the steering stability of the vehicle. Typically, the stabilizer bar is a rodshaped member having an elongated central segment oriented to extend laterally across the vehicle and an arm segment extending longitudinally at each end of the central segment to form a generally U-shaped configuration. The central segment of the stabilizer bar is supported for rotation about its own longitudinal axis by one or more mounting brackets which are fixed to the vehicle body or frame. Most commonly, the mounting brackets are positioned in close proximity to the arm segments for minimizing any bending moments which may be induced into the stabilizer bar. The distal end of each arm segment is coupled to a control arm of the suspension system by an end link. When the vehicle is subjected to a lateral rolling force such as, for example, while the vehicle negotiates a turn, the arm segments pivot in opposite directions with respect to the longitudinal axis of the central segment. As a result, torsional reaction forces are generated which act through the arm segments to urge the control arms to move toward their normal position. Thus, the vehicle body will be prevented from excessive rolling or leaning to either side by the torsional resistance produced by the stabilizer bar.

As noted, each end of the stabilizer bar is typically attached to a corresponding control arm by an end link. Although a number of means have been proposed for connecting the stabilizer bar to the end link, none thus far available has been found acceptable in terms of simplicity and cost reduction. For instance, most stabilizer bars must be manufactured with an eye-form at the distal end for attachment to the end link. One attempt to eliminate the requirement for an eye-form on the stabilizer is to provide an end link including a ring shaped aperture formed therein for receiving the end of the stabilizer bar arm. However, these end links have been found to be costly to produce and also compromise the ride quality of the vehicle by making the ride feel harsher during normal driving conditions.

One trend within the vehicular suspension art is to utilize hollow stabilizer bars for reducing weight without sacrificing driving feel and ride stability. Unfortunately, forming the stabilizer bar as a hollow tube increases the complexity of the attachment mechanisms required to connect the end of the stabilizer bar to the end link. Moreover, the hollow construction of the stabilizer bar can also sacrifice the integrity of the attachment coupling. A second trend employs a direct-acting end link, or direct link, between the stabilizer bar and the lower control arm. The direct link may include a ball and socket assembly for accommodating the angularity between the stabilizer bar and the control arm as the suspension travels through its range of motion while also eliminating the amount of compliance that is experienced before the stabilizer bar begins to urge the control arm to its normal position during vehicle maneuvers. Although these direct links have experienced great success, they still require the end of the stabilizer bar to include an eye-form for attachment. Therefore, the performance advantages gained by the direct link are typically set off by the cost and complexity required for attaching to the stabilizer bar.

Therefore, it would be desirable to provide a direct link for a hollow stabilizer bar which quickly and easily attaches to the end of the stabilizer bar with minimum complexity.

SUMMARY OF THE INVENTION

The present invention provides a suspension assembly for a motor vehicle including a pair of end links which interconnect the opposite ends of a stabilizer bar to a pair of suspension members. The stabilizer bar has a central segment and arm segments extending from each end of the central segment. The end links interconnect the distal ends of the arm segments to the suspension members. The distal end of each arm segment includes an axial bore which is adapted to receive a stud extending from each end link. The stud cooperates with the axial bore to provide a secure attachment between the stabilizer bar and the end link.

As a further feature of the present invention, the axial bore may be internally threaded to receive external threads formed on the stud of the end link. As such, this threaded arrangement permits the stabilizer bar to be attached to the end link quickly and easily and with a minimum of components.

BRIEF DESCRIPTION OF THE DRAWINGS

In order to appreciate the manner in which the advantages and objects of the invention are obtained, a more particular description of the invention will be rendered by reference to specific embodiments thereof which are illustrated in the appended drawings. Understanding that these drawings only depict preferred embodiments of the present invention and are not therefore to be considered limiting in scope, the invention will be described and explained with additional specificity and detail through the use of the accompanying drawings in which.

DETAILED DESCRIPTION OF THE INVENTION

In general, the present invention is directed toward an end link for connecting a stabilizer bar to a suspension member, such as a control arm, in a vehicle suspension. The end link of the present invention is adapted to replace most conventional end links and to work in conjunction with a modified stabilizer bar to provide improved performance in a vehicle suspension. Thus, the end link of the present invention may be utilized with a wide variety of suspension systems and is not intended to be limited to the particular application described herein.

Figure 1:
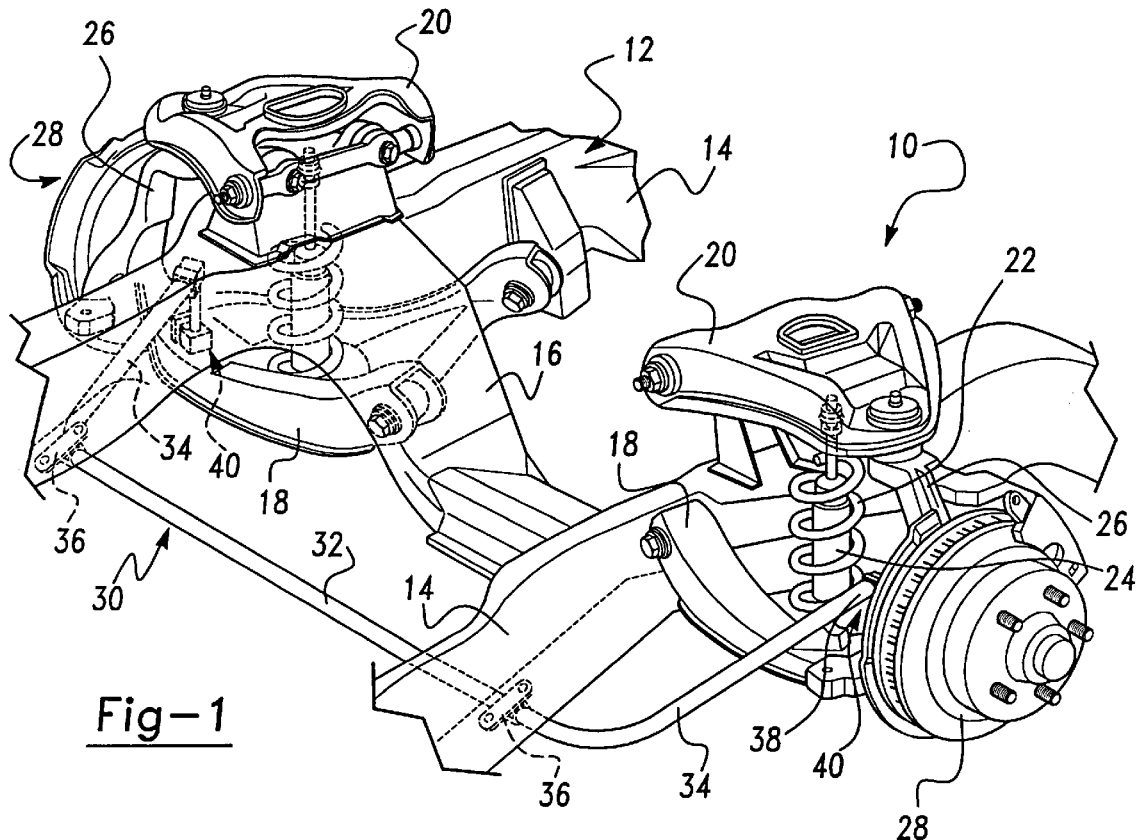
FIG. 1 is a perspective view of an exemplary independent front wheel suspension system into which the present invention is incorporated.

Turning now to the drawings, FIG. 1 shows an independent front wheel suspension system generally indicated at 10, of the type having upper and lower control arms and a strut assembly at each wheel which are suspended from the vehicle frame. Reference will be made to a vehicle frame in the present disclosure, yet those skilled in the art will recognize that many current vehicles do not have a frame as such but instead have regions of the body which act as an integrated frame structure. With this in mind, frame 12 is shown to partially include a pair of longitudinal side rails 14 and a crossbeam 16.

Suspension system 10 includes a long lower control arm 18 and a short upper control arm 20 which are both pivotally attached to frame 12. A strut assembly having a helical coil spring 22 and a strut damper 24 is retained between an intermediate portion of lower control arm 18 and frame 12 to support the weight of the vehicle body and any loads which are transmitted through lower control arm 18. Upper control arm 20 is connected to lower control arm 18 by a steering knuckle 26. A hub and rotor assembly 28 is rotatably attached to a spindle portion (not shown) of steering knuckle 26 such that a wheel and tire (also not shown) may be mounted thereon. A stabilizer bar 30 is shown to include an elongated central segment 32 which extends laterally across the vehicle and a pair of arm segments 34 which extend longitudinally along the vehicle at each end of central segment 32. Central segment 32 is rotatably attached to frame rails 14 by a pair of mounting brackets 36. A distal end 38 of each arm segment 34 is connected to a corresponding lower control arm 18 by an end link 40 made in accordance with the teachings of the present invention.

Figure 2:
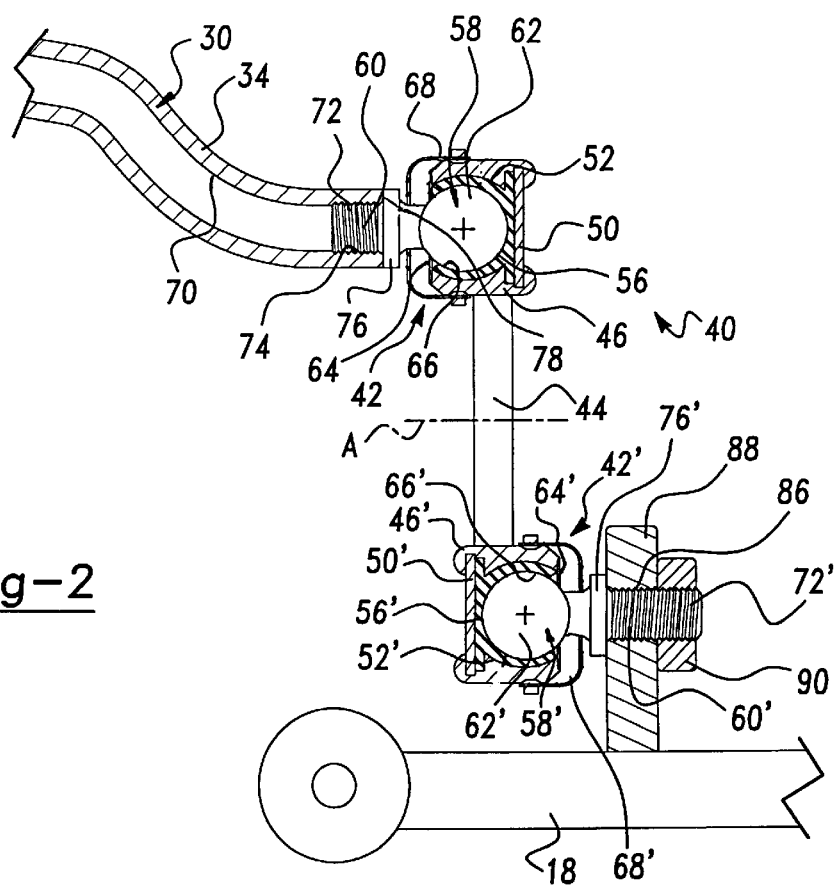
FIG. 2 is a sectional view of a portion of the suspension system shown in FIG. 1 and which illustrates a stabilizer bar and direct link made in accordance with one preferred embodiment of the present invention.
Figure 3:
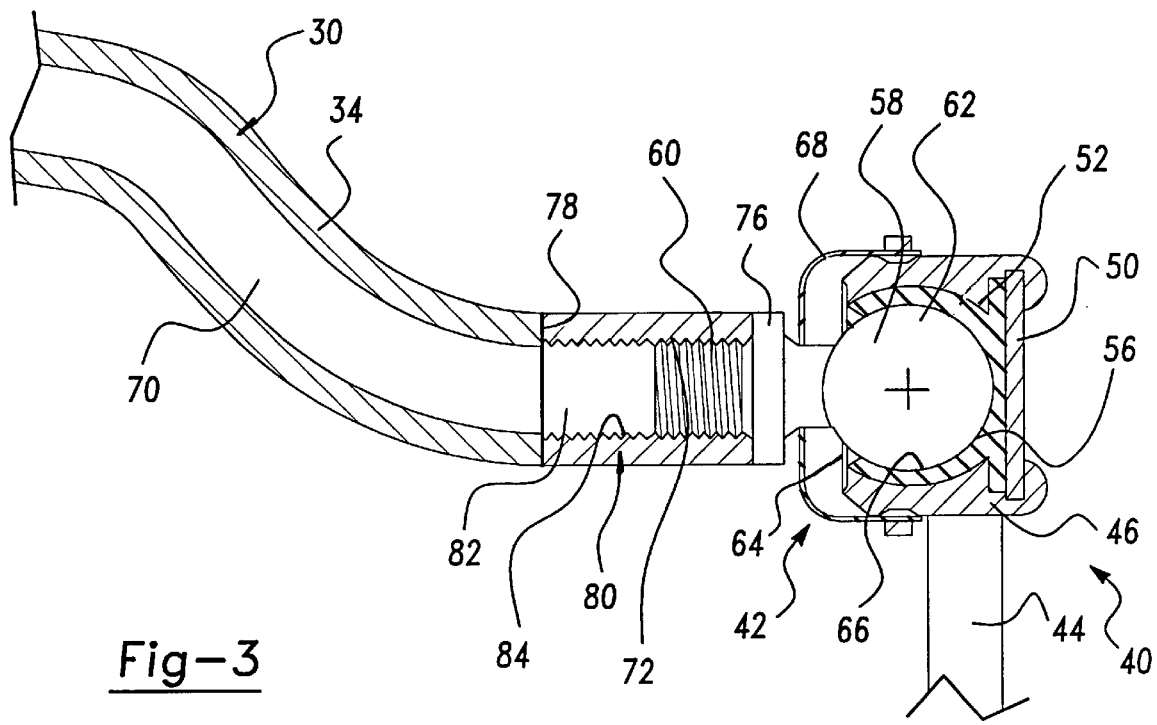
FIG. 3 is a partial sectional view showing a modified version of the stabilizer bar and direct link shown in FIG. 2.

Referring to FIGS. 2 and 3, end link 40 is shown fastened to stabilizer bar 30 at one end and to lower control arm 18 at its opposite end. In general, the components of end link 40 are symmetrical about a horizontal plane, identified by construction line "A". In fact, end link 40 is assembled from a set of components including two ball joint assemblies 42 and 42' which are rigidly interconnected by suitable means such as, for example, a rod 44. Due to the similarity of the components associated with ball joint assembly 42' with respect to the components of ball joint assembly 42, its components are identified with the same reference numerals but having a primed designation.

Ball joint 42 includes a hollow cylindrical housing 46 fixedly secured by welding or other conventional means to rod 44. A disc-shaped end cap 50 is retained in housing 46 adjacent to its spherical wall 52 for defining a socket cavity therewith. A hollow spherical sleeve 56 is disposed within the socket cavity and defines a spherical socket 66. Ball joint assembly 42 also includes a ball stud 58 having a shank segment 60 and a ball segment 62 which is disposed in socket 66 and retained therein via a spring retainer 64 secured to housing 46. Retainer 64 includes a central opening for cooperating with an external surface of ball segment 62. A seal boot 68 encloses ball segment 62 and may be secured to housing 46 by bolts or other conventional means.

With continued reference to FIGS. 2 and 3, stabilizer bar 30 is shown to include an axial bore 70 formed therein. In the embodiment illustrated, stabilizer bar 30 is of the hollow type which is preferred in the present invention. However, the skilled artisan will appreciate that axial bore 70 may also be formed in the terminal end of a solid stabilizer bar by drilling or tapping. To provide means for securing ball stud 58 to stabilizer bar 30, external threads 72 on shank 60 are threaded into internal threads 74 formed in axial bore 70 of stabilizer bar 30. Ball stud 58 is tightened into stabilizer 30 a preselected distance or until a plate 76 engages the end 78 of the stabilizer bar 30. As an alternative, ball stud 58 need not be threaded into axial bore 70, but instead may be retained therein by welding or by simply crimping distal end 78 to create a lip flange.

As an alternative to the embodiment illustrated in FIG. 2, FIG. 3 illustrates an end adapter 80 welded to distal end 78 of stabilizer bar 30. End adapter 80 includes an axial bore 82 having internal threads 84. As such, external threads 72 formed on shank 60 of ball stud 58 may be threaded into internal threads 84 formed in axial bore 82 of end adapter 80 to secure ball stud 58 to stabilizer bar 30. As can be appreciated, end adapter 80 is ideally suited for use in conjunction with a stabilize bar of the solid type. It should also be noted that any typical methods of welding, including friction welding or laser welding, are within the contemplated scope of this invention.

As noted, end link 40 is adapted for connection between control arm 18 and stabilizer bar 30. To this end, and as illustrated in FIG. 2, a bore 86 is formed in a bracket 88 extending from lower control arm 18. Threaded shank 60' of ball stud 58' is then inserted through bore 86 in bracket 88. A suitable fastener, such as lock nut 90, is threaded onto threaded shank 60' and tightened to a suitable torque level. Alternatively, bore 86 may include internal threads for cooperating with external threads 72' on shank 60'. At this point, end link 40 is secured between arm segment 34 of stabilizer bar 30 and lower control arm 18.

Figure 4:
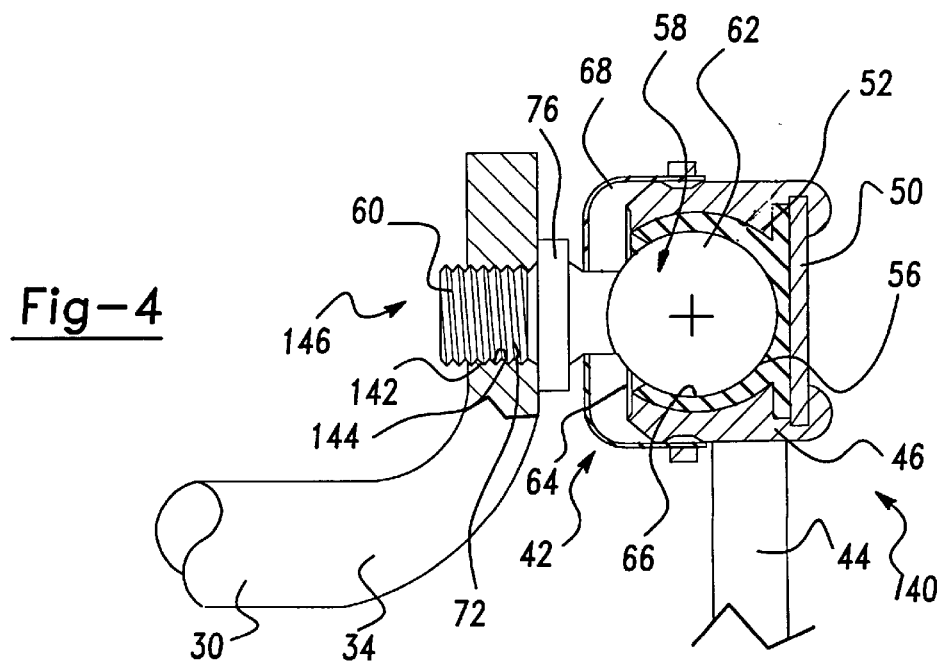
FIG. 4 is a sectional view of a portion of the suspension system shown in FIG. 1 and which illustrates a stabilizer bar and end link made in accordance with another preferred embodiment of the present invention.

An end link 140 according to another embodiment of the present invention is shown in FIG. 4 wherein similar components thereof are identified by like reference numbers used to describe end link 40. In general, the components of end link 140 are substantially similar to those of end link 40 with the exception that arm segments 34 are now shown to include a bore 142. Bore 142 includes internal threads 144 which are adapted to mesh with external threads 72 on shank 60 of ball stud 58. Accordingly, end link 140 is joined with a tapped eye-form 146 of stabilizer bar 30. As such, end link 140 can be used in retrofit applications into existing vehicle suspensions originally equipped with prior art type stabilizer bars to allow flexibility of design for the suspension engineer.

Figure 5:
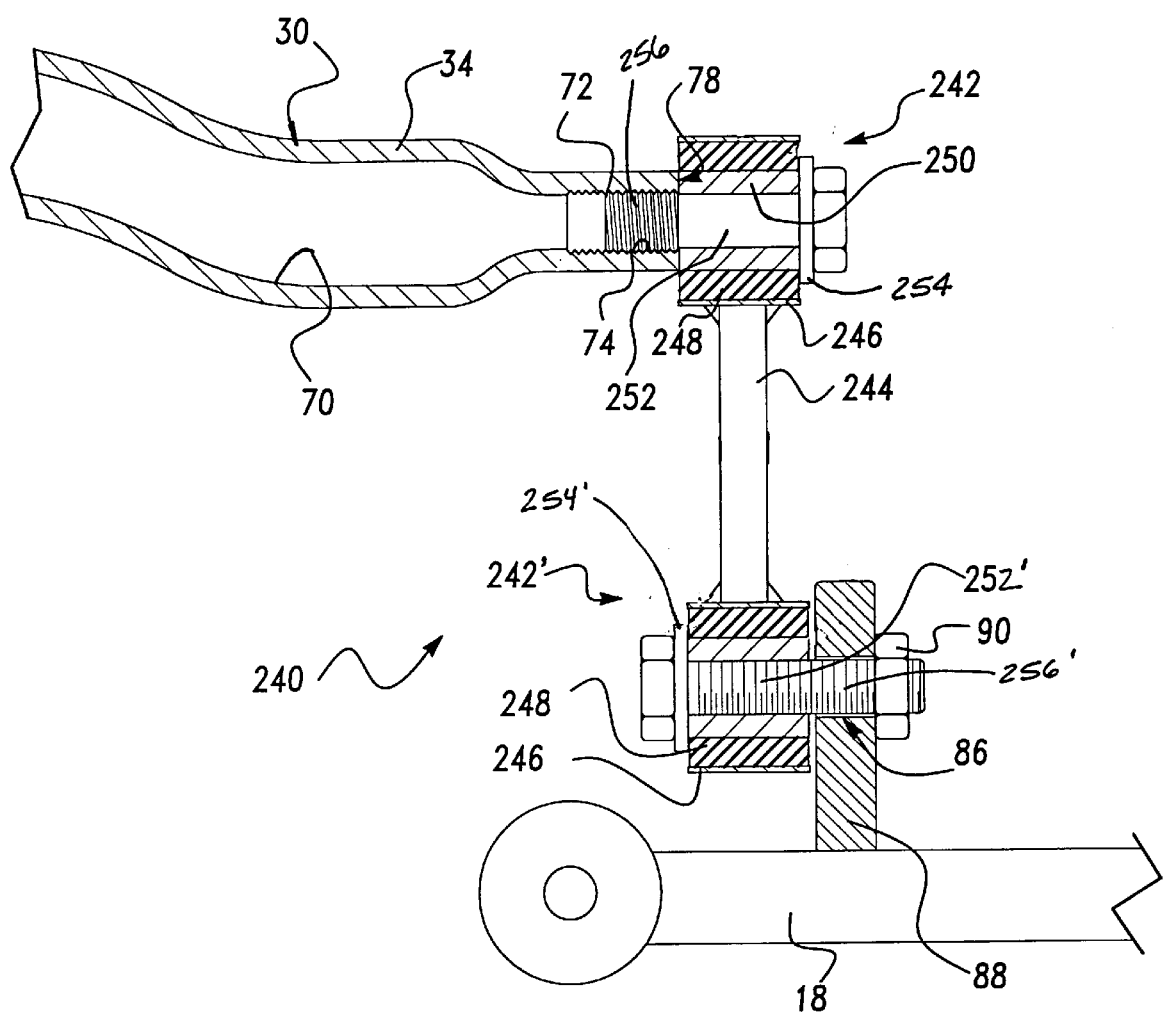
FIG. 5 is a sectional view of a portion of the suspension system shown in FIG. 1 illustrating a stabilizer bar and end link made in accordance with yet another embodiment of the present invention.

Referring now to FIG. 5, an end link 240 made in accordance with yet another embodiment of the present invention is shown. Unlike the previous embodiments, end link 240 is assembled from a pair of elastomeric bushings 242 and 242' fixed (i.e., welded) to opposite ends of a rod 244. Specifically, elastomeric bushing 242 includes a hollow housing 246 within which an annular rubber bushing 248 is retained. Bushing 248 is mounted on an end portion 250 of stabilizer bar 30. A threaded fastener 252 passes through a lock washer 254 such that its external threads 256 engage internal threads 74 in arm segment 34 of stabilizer bar 30.

The embodiment depicted in FIG. 5 also illustrates another feature of the present invention. That is, stabilizer bar 30 includes an extruded end 250 having a reduced diameter as compared to the remainder of arm segment 34 of stabilizer bar 30. By extruding end 250 of stabilizer bar 30 to a preselected diameter, stabilizer bars having different diameters may be manufactured to include a standard size end 250 for cooperating with a standard size threaded shank 60 of ball stud 58 or a threaded bolt 252. While bolt 252 is shown to threadingly engage axial bore 70, bolt 252 could also be welded thereto, with our without threads, or joined by another method now known or later developed, without deviating from the present invention. Furthermore, bolt 252 may engage an end adapter welded to stabilizer bar 30, as illustrated in FIG. 3.

As opposed to prior art end links which utilize specialized components in order to provide attachment between the stabilizer bar and end link, each end link of the present invention disclosed herein utilizes a shaft cooperating with a bore formed in the distal end of the stabilizer bar. One advantage of these end links is that there is no need for additional parts such as lock nuts or the like as used in the prior art. As such, the present invention is designed such that there is minimal complexity and lower costs. As a result of the streamlined design, manufacturing time and total weight is reduced and a very small space within the vehicle underbody is consumed.

Those skilled in the art can now appreciate from the foregoing description that the broad teachings of the present invention can be implemented in a variety of forms. For example, the threads on the ball stud or bolt may be formed as self-tapping to eliminate the need for forming the bore in the distal end of the stabilizer bar. Therefore, while this invention has been described in connection with particular examples thereof, the true scope of the invention should not be so limited since other modifications will become apparent to the skilled practitioner upon a study of the drawings, specification, and following claims.

What is claimed is:

1. An end link adapted for interconnecting a stabilizer bar to a suspension member within a vehicular suspension system, said end link comprising:
   a first joint assembly having a first housing, a bushing mounted between said first housing and an end segment of the stabilizer bar, and a bolt having a threaded shank retained in a threaded bore formed in said end segment of the stabilizer bar;
   a second joint assembly coupled to the suspension member and having a second housing; and
   a connector coupling said first housing to said second housing.

2. The end link of claim 1 wherein said threaded bore in the stabilizer bar is an axial bore formed in said end segment of the stabilizer bar.

3. The end link of claim 1 wherein said threaded bore is an axial bore formed in an end adapter that is fixed to said end segment of the stabilizer bar.

4. The end link of claim 1 wherein said threaded bore is formed radially in the stabilizer bar.

5. The end link of claim 1 wherein said threaded bore further comprises an axial bore formed in an extruded portion of said end segment of the stabilizer bar.

6. The end link of claim 5 wherein said bushing is mounted on said extruded end segment of the stabilizer bar.

7. The end link of claim 1 wherein said bushing has an outer surface secured to said first housing and an inner surface engaging an outer surface of said end segment of the stabilizer bar.

8. The end link of claim 7 wherein said first joint assembly further includes a washer mounted on said shank of said bolt and which is disposed between said end segment of the stabilizer bar and a head segment of said bolt.

9. The end link of claim 1 wherein said second joint assembly includes a second bushing retained in said second housing, and a second bolt having a shank extending through a bore in the suspension member.

10. An end link for use in a vehicular suspension system to interconnect a stabilizer bar to a suspension member, said end link comprising:
    a first joint assembly having a first housing, a first bushing secured in said housing and surrounding an end segment of the stabilizer bar, and a first bolt having a shank segment threaded into a bore formed in said end segment of the stabilizer bar;
    a second joint assembly having a second housing, a second bushing secured in said second housing, and a second bolt having a shank extending through said second bushing and which is fixed to the suspension member.

11. The end link of claim 10 wherein said bore in the stabilizer bar is a threaded bore formed in said end segment of the stabilizer bar.

12. The end link of claim 10 wherein said bore is a threaded bore formed in an end adapter that is fixed to said end segment of the stabilizer bar.

13. The end link of claim 10 wherein said bore is a threaded bore formed in an extruded portion of said end segment of the stabilizer bar.

14. The end link of claim 13 wherein said first bushing is mounted on said extruded end segment of the stabilizer bar.

15. The end link of claim 10 wherein said first joint assembly further includes a washer mounted on said shank of said first bolt and which is disposed between said end segment of the stabilizer bar and a head segment of said first bolt.

16. A suspension system for a motor vehicle comprising:
    a stabilizer bar having an end segment with a threaded bore formed therein;
    a suspension member; and
    an end link connecting said stabilizer bar to said suspension member, said end link including a first joint assembly interconnected to a second joint assembly, and wherein one of said first and second joint assemblies includes a bushing mounted on said end segment of said stabilizer bar, and a bolt having a threaded shank segment retained in said threaded bore for securing said bushing to said end segment of said stabilizer bar.

17. The suspension system of claim 16 wherein said threaded bore in said stabilizer bar is an axial bore formed in said end segment of said stabilizer bar.

18. The suspension system of claim 16 wherein said threaded bore is formed in an end adapter fixed to said end segment of said stabilizer bar.

19. The suspension system of claim 16 wherein said threaded bore is an axial bore formed in an extruded portion of said end segment of said stabilizer bar.

20. The suspension system of claim 16 wherein said first joint assembly further includes a washer mounted on said shank segment of said bolt and which is disposed between said end segment of said stabilizer bar and a head segment of said bolt.

* * * * *